Figure 4:
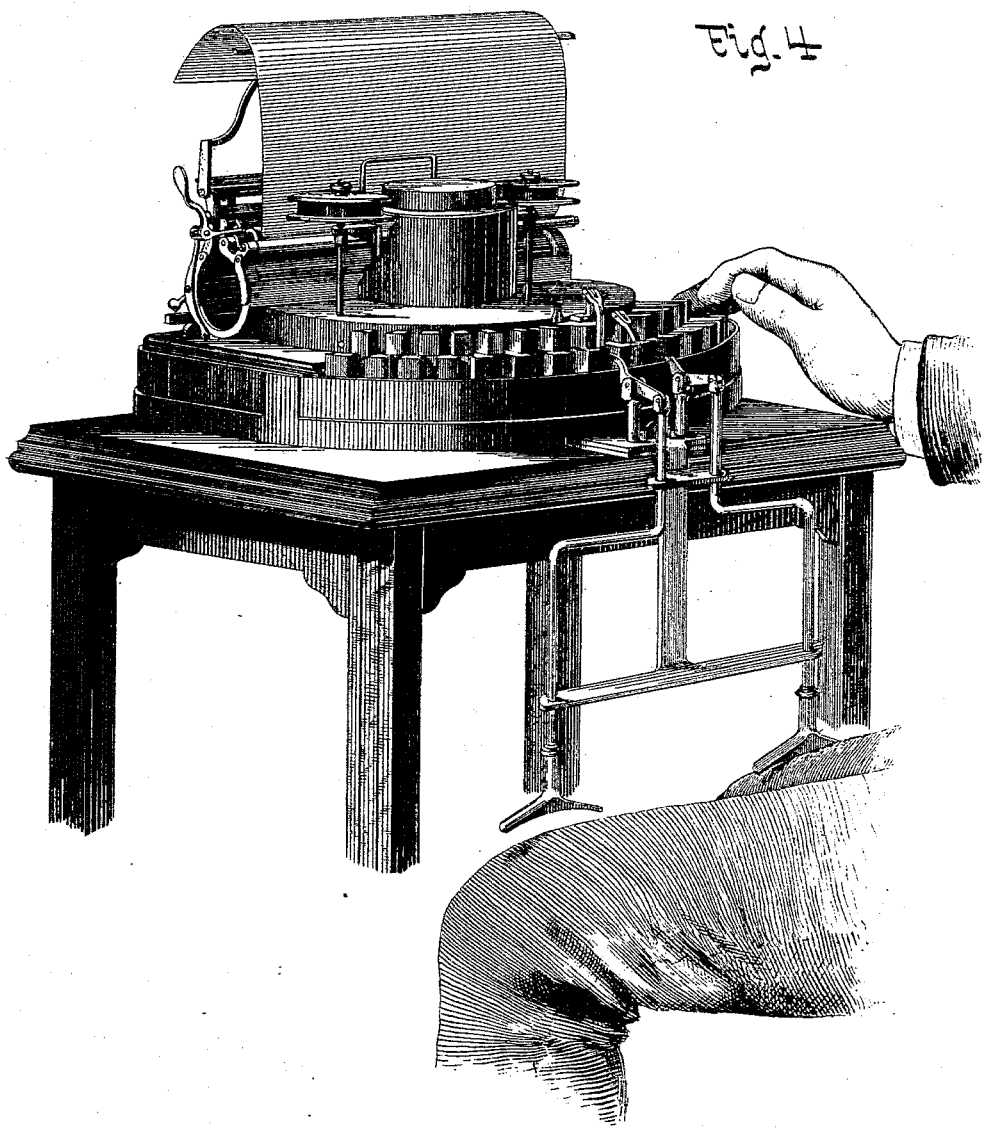

(No Model.) 2 Sheets—Sheet 1.
J. McSWEENEY.
ATTACHMENT FOR TYPE WRITING MACHINES.
No. 412,114. Patented Oct. 1, 1889.
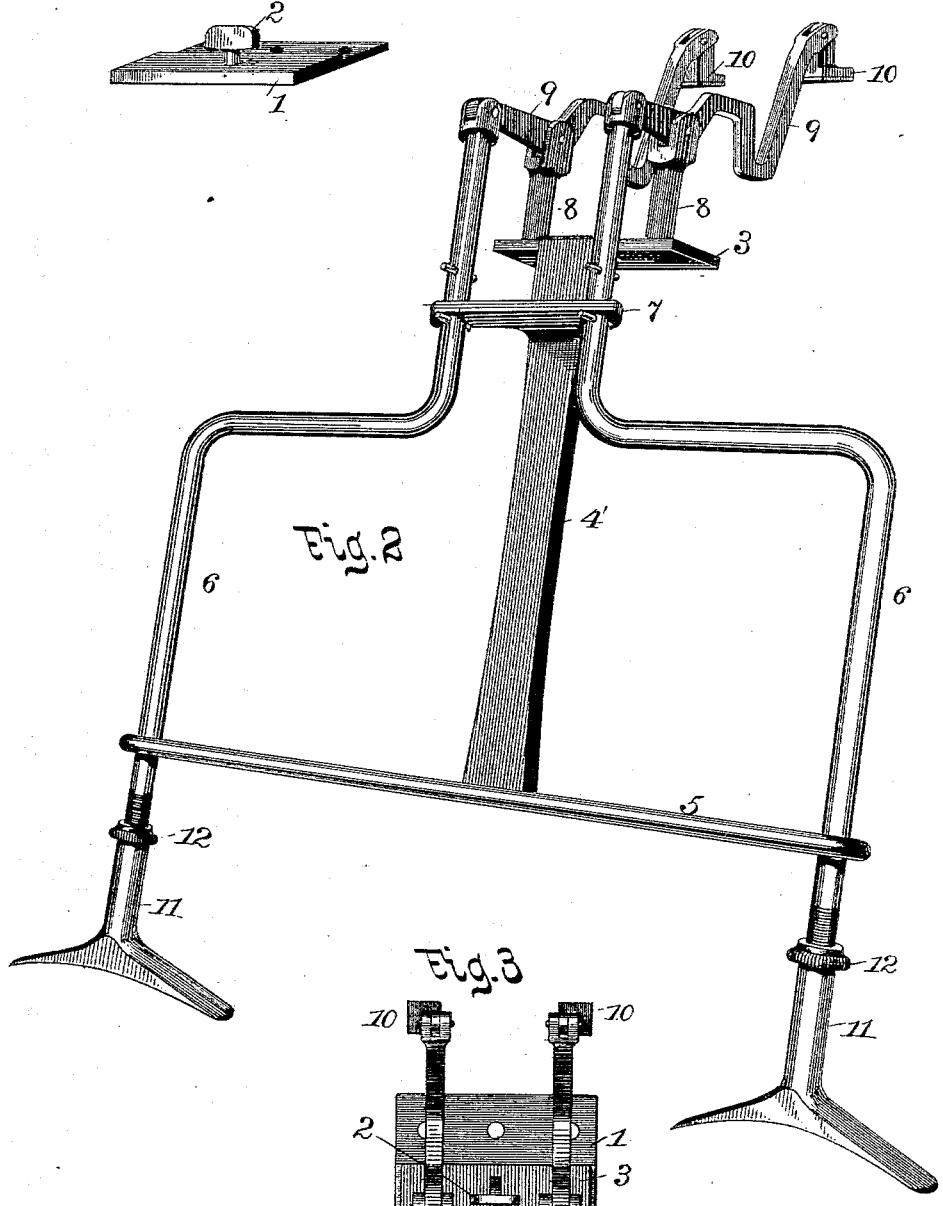
Witnesses
Frank H. Pierpont
Wm. T. Emerson
Inventor
John McSweeney (No Model.) 2 Sheets—Sheet 2.

J. McSWEENEY.
ATTACHMENT FOR TYPE WRITING MACHINES.

No. 412,114. Patented Oct. 1, 1889.

Witnesses

Inventor

UNITED STATES PATENT OFFICE.

JOHN McSWEENEY, OF WILMINGTON, DELAWARE.

ATTACHMENT FOR TYPE-WRITING MACHINES.

SPECIFICATION forming part of Letters Patent No. 412,114, dated October 1, 1889.

Application filed April 19, 1888. Serial No. 271,186. (No model.)

*To all whom it may concern:*

Be it known that I, JOHN McSWEENEY, a citizen of the United States, residing at Wilmington, in the county of New Castle and State of Delaware, have invented a new and useful Improvement in Attachments for Type-Writing Machines, of which the following is a specification.

This invention is an attachment for type-writers, and is intended especially for use on the one known as the "Hammond," but may be adapted for use on others by a slight change in its construction.

The object of the invention is to provide a ready means for depressing the keys marked "Cap." and "Fig." by the movement of the knees of the operator, in connection with the attachment, without the aid of the hand, as is now done.

In the drawings, Figure 1 represents a perspective view of the base-plate 1, which is attached to the machine; Fig. 2, a perspective view of the entire attachment; Fig. 3, a plan view of the same, and Fig. 4 a perspective view illustrating the manner of using the machine with my attachment applied thereto.

To enable others to make and properly use my invention, I will proceed to describe fully the construction and manner of operation of the same.

1, Fig. 1, represents the base-plate, of any proper size, which by means of suitable openings is adapted for attachment to the machine, as shown in Fig. 4.

2, Figs. 1 and 3, represents a screw attached to the base-plate 1 in such manner as to be capable of turning thereon.

3, Figs. 2 and 3, represents the base-plate of the attachment, which is provided with a slot 4, Fig. 3, as shown. By means of this slot and the screw 2 the attachment is capable of being secured to or removed from the machine, as may be desired.

4', Fig. 2, represents a vertical bar depending from the plate 3, and 5 a cross rod or bar secured to the lower end of the same, as shown, which rod or bar is provided at its ends with guide-openings for the bent rods 6 6.

7 represents a cross plate or bar secured to the vertical bar 4' at the proper point, which is also provided at each end with guide-openings for the rods, as shown.

8 8 represent vertical standards rising from the plate 3, each of which is provided at its upper end with a slotted bearing adapted, in connection with a pivot-pin, to support one of the levers 9 9, as shown, the front end of which lever is attached to the upper end of the bent rod 6 6, as shown.

10 10 represent a bearing-plate united by a pivot-connection to the rear ends of the levers 9 9, as shown.

11 11 represent knee-pieces having threaded sockets above adapted to take the screw-threaded portion at the lower end of the rod 6 6.

12 12 represent jam-nuts by means of which the knee-pieces after adjustment may be secured in place.

When the attachment is in its proper position upon the machine and the operator is seated before it, the knees of the operator are in position beneath the knee-pieces 11 11 and one of the bearing-plates 10 10 rests upon the figure-key and the other upon the capital-key of the Hammond machine, as shown in Fig. 4.

The operation is substantially as follows: At the proper time in the operation of the machine it is desired to use either the figure or capital key the corresponding knee of the operator is raised for that purpose. By the elevation of the knee-piece the bent rod is caused to actuate the corresponding lever 9 and depress the corresponding bearing-plate 10 upon the key. By means of this construction the operator is enabled to use all of the fingers of both hands to manipulate the regular keys and the knees to manipulate the figure and capital keys, and consequently a greater speed is attained than is otherwise possible.

By modifying the form of the levers this attachment may be applied to other type-writers than the Hammond.

Having thus fully described my invention, what I claim as new, and desire to secure by Letters Patent, is—

1. The base-plate 1, the screw 2, and the slotted base-plate 3, the vertical bar 4', the cross-rod 5, the bent rods 6 6, a cross-plate 7, vertical standards 8 8, the levers 9 9, the bearing-plates 10 10, and knee-pieces 11 11, all combined and arranged as and for the purpose described.

2. The combination of the following elements: the base-plate 3, adapted to rest upon the machine, the vertical standards 8 8 on the base-plate 3, the actuating-levers 9 9, the dependent bar 4′, the sliding rod of the levers, and the knee-pieces adapted to actuate the sliding rods, as described.

This invention signed and witnessed this 17th day of April, 1888.

JOHN McSWEENEY.

Witnesses:
FRANK E. SMITH,
C. B. WHITE.